No. 735,538. Patented August 4, 1903.

UNITED STATES PATENT OFFICE.

JULIUS LEWY, OF BIEBRICH, GERMANY.

ARTIFICIAL WAX.

SPECIFICATION forming part of Letters Patent No. 735,538, dated August 4, 1903.

Application filed May 26, 1903. Serial No. 158,856. (No specimens.)

*To all whom it may concern:*

Be it known that I, JULIUS LEWY, a subject of the King of Prussia, German Emperor, and a resident of Biebrich-on-the-Rhine, in the Kingdom of Prussia, German Empire, have invented new and useful Improvements in Artificial Wax, of which the following is a full, clear, and exact specification.

By my invention a ketone of the acetone series or a mixture of such ketones is added to substances used in making artificial-wax compositions destined, for instance, for the manufacture of candles, wax matches, wax flowers, and the like, such as paraffins or mixtures of paraffin with ceresins or stearin, (a mixture of stearic acid and palmitic acid,) such as are used for making so-called "composite" candles, and other mixtures. This addition has the effect of suppressing the more or less great transparency of paraffin and of the mixtures of paraffin with the compounds mentioned above and will give to these substances the white color of good stearic acid, a fact particularly valuable in the manufacture of composite candles, imitated wax matches, wax flowers, and the like. Furthermore, if these new mixtures are used in the manufacture of candles these candles get an increase of their illuminating power and produce a bigger and whiter flame than candles without the addition of acetone or its homologues. Finally, the bad smell that appears when other candles are extinguished is suppressed. The proportion of the ketone or ketones may vary within large limits, and the mixture is made at a temperature suitable to the nature of the materials used.

The acetone or its homologues are mixed with the other substances used while these are in a melted condition. The evaporation of the added ketones is avoided by operating at sufficiently low temperatures or in a closed vessel provided with a reflux-cooler. The melted material must be constantly stirred while adding the ketone or ketones in order to obtain a homogeneous mixture. Good results have been obtained, for instance, according to the following examples. The parts are by weight.

Example 1: Fifteen (15) parts of acetone are added to eighty-five (85) parts of melted paraffin.

Example 2: Fifteen (15) parts of acetone are added to a melted mixture of seventy (7) parts of paraffin and fifteen (15) parts stearin; but I can obtain the desired effect an addition of much less acetone and stea to paraffin, as shown in the following exa ples.

Example 3: Five (5) parts of acetone added to a melted mixture of five (5) parts stearin and ninety (90) parts of paraffin.

Example 4: Five (5) parts of acetone added to a mixture of (5) parts of ceresin wi ninety (90) parts of paraffin.

Example 5: Five (5) parts of acetone added to a mixture of five (5) parts of ceres five (5) parts of stearin, and eighty-five (8 parts of paraffin.

In all these examples instead of acetone o of its homologues, or mixtures thereof, su as the so-called "acetone-oils," may be us It must be understood that instead of usi solely paraffin or the mixture of paraffin a stearin, &c., coloring substances and such a ditions may be intermixed which are able lower or to raise the melting-point of the m ture.

I am aware that acetone has been here fore proposed as a solvent for paraffin. Su a mixture, however, differs radically from t new mixture, inasmuch as in the latter t paraffin is in excess and is therefore not he in solution.

Having thus described my invention, claim as new and desire to secure by Lett Patent—

1. As a new composition of matter, a m ture containing a ketone of the acetone seri and an excess of paraffin.

2. As a new composition of matter, a m ture containing a ketone of the acetone seri paraffin and stearin.

3. As a new composition of matter, a m ture containing a ketone of the acetone seri paraffin and ceresin.

4. In a new composition of matter, a mi ture containing a ketone of the acetone seri paraffin, stearin and ceresin.

In testimony that I claim the foregoing my invention I have signed my name in pr ence of two subscribing witnesses.

JULIUS LEWY.

Witnesses:
WOLDEMAR HAUPT,
HENRY HASPER.